(12) United States Patent
Van Parys

(10) Patent No.: US 9,929,957 B2
(45) Date of Patent: Mar. 27, 2018

(54) FLEXIBLY MAXIMIZE HARDWARE CAPABILITIES IN HIGHLY VIRTUALIZED DYNAMIC SYSTEMS

(71) Applicant: International Business Machines Corporation, Armonk, NY (US)

(72) Inventor: Mark H. Van Parys, Red Hook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 14/869,256

(22) Filed: Sep. 29, 2015

(65) Prior Publication Data

US 2017/0093719 A1 Mar. 30, 2017

(51) Int. Cl.
*H04L 12/801* (2013.01)
*H04L 29/12* (2006.01)

(52) U.S. Cl.
CPC .......... *H04L 47/12* (2013.01); *H04L 61/2038* (2013.01); *H04L 61/6022* (2013.01)

(58) Field of Classification Search
CPC ...................................................... H04L 47/12
See application file for complete search history.

(56) References Cited

U.S. PATENT DOCUMENTS

| 8,990,799 | B1 | 3/2015 | Forecast | |
|---|---|---|---|---|
| 2004/0068653 | A1* | 4/2004 | Fascenda | H04L 9/0844 713/168 |
| 2006/0182073 | A1* | 8/2006 | Pani | H04W 84/12 370/338 |
| 2007/0217351 | A1* | 9/2007 | Kurita | H04W 48/06 370/312 |
| 2008/0089340 | A1 | 4/2008 | Tong | |
| 2009/0222558 | A1* | 9/2009 | Xu | G06F 9/485 709/224 |
| 2013/0223214 | A1* | 8/2013 | Takaoka | H04L 49/30 370/230 |
| 2015/0026448 | A1 | 1/2015 | Jiang et al. | |

OTHER PUBLICATIONS

List of IBM Patents or Patent Applications Treated as Related; (Appendix P), filed Mar. 10, 2016; 2 pages.

(Continued)

*Primary Examiner* — Noel Beharry
*Assistant Examiner* — Sharmin Chowdhury
(74) *Attorney, Agent, or Firm* — Cantor Colburn LLP; Teddi Maranzano

(57) ABSTRACT

A method, computer program product, and/or system for maximizing hardware capabilities of a network interface card are provided. To maximize hardware capabilities of the network interface card, a media access control address for associating with the network interface card is received and a number of media access control addresses defined to the network interface card is compared to a maximum threshold of the network interface card. Then, in response to when the number is equal to or exceeds the maximum threshold of the network interface card, a promiscuous mode is enabled for network interface card and the media access control address is associated with the network interface card.

12 Claims, 4 Drawing Sheets

(56) References Cited

OTHER PUBLICATIONS

Mark H. Van Parys, "Flexibly Maximize Hardware Capabilities in Highly Virtualized Dynamic Systems", U.S. Appl. No. 15/066,551, filed Mar. 10, 2016.
Anonymously: "Autonomous Protocol Address Discovery in a Virtualized Host to Network Environment"; IP.com No. 000223125; Nov. 5, 2012; pp. 3.
Anonymously: "Efficient Address resolution in DOVE network"; IP.com No. 000236018; Apr. 2, 2014; pp. 2.
Anonymously: "Single Route I/O Virtualization—Dynamic Network Optimizer"; IP.com No. 000231850; Oct. 9, 2013; pp. 6.

\* cited by examiner

FLEXIBLY MAXIMIZE HARDWARE CAPABILITIES IN HIGHLY VIRTUALIZED DYNAMIC SYSTEMS

BACKGROUND

The present disclosure relates generally to virtualized networking systems, and more specifically, to maximizing hardware capabilities of highly virtualized dynamic networking systems.

In general, contemporary networking systems operate in dynamic environments where a configured number of media access control (MAC) addresses often exceed a threshold capability of associated hardware, such as network interface card (NIC). In this case, the NIC must be put into a (promiscuous) mode that forces the contemporary networking systems to process and filter a higher than normal volume of packets, which results in various forms of performance degradation. Additionally, when the configured number of MAC addresses subsequently fall back under the threshold capability of the NIC (with merely a list of configured MACs) there is at present no way to optimize an earliest point at which the mode can be disabled to reduce the processing/filtering operations and reclaim improved performance of the system.

SUMMARY

Embodiments herein relate to a method, system, and/or computer program product for maximizing hardware capabilities of network interface card. The embodiments include receiving a media access control address for associating with the network interface card; comparing a number of media access control addresses defined to the network interface card to a maximum threshold of the network interface card; and in response to when the number is equal to or exceeds the maximum threshold of the network interface card enabling a promiscuous mode for network interface card, and associating the media access control address with the network interface card Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
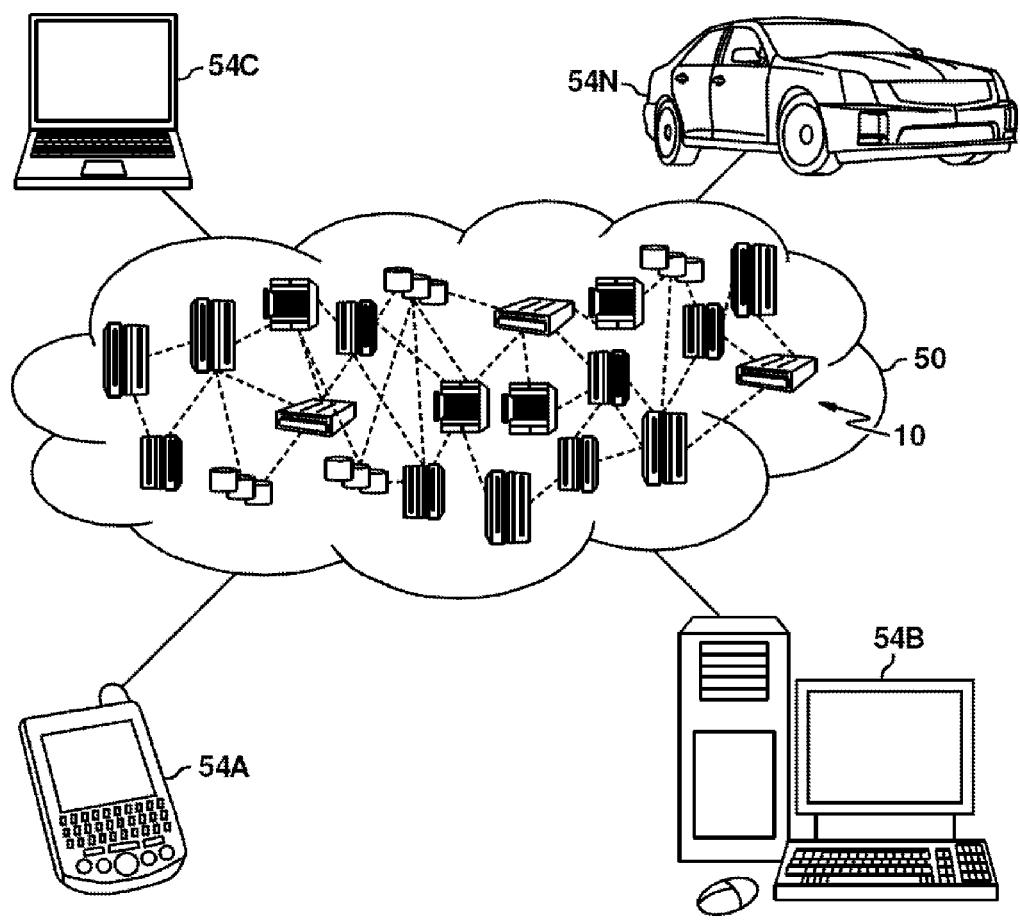
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
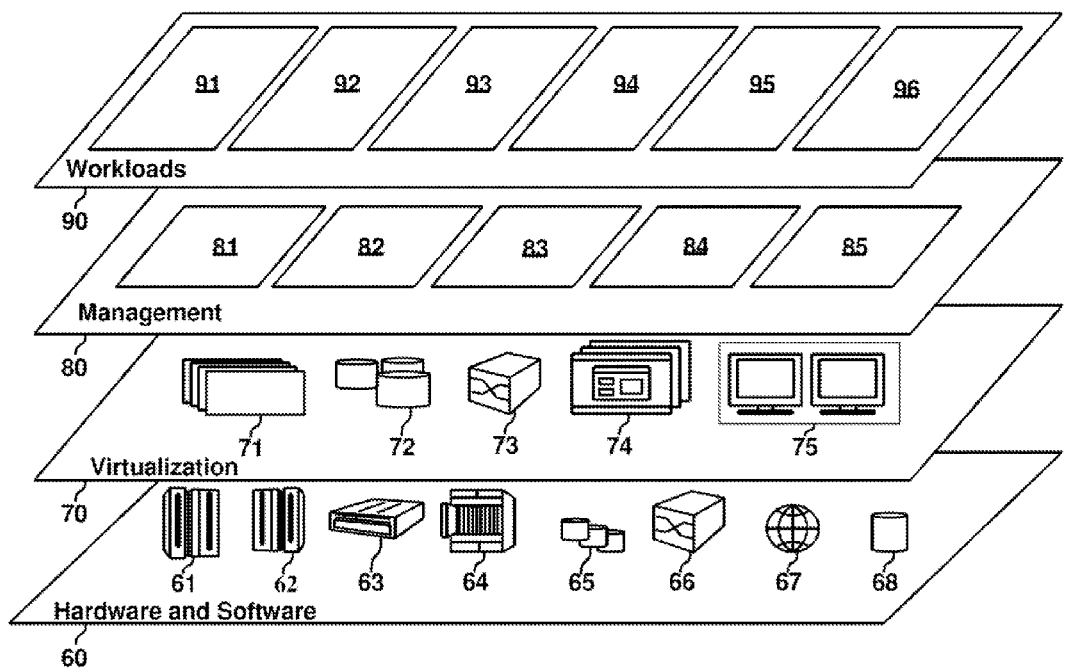
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

In view of the above, embodiments described herein relate to virtualized networking systems, and more specifically, to maximizing hardware capabilities of highly virtualized dynamic networking systems.

In general, to maximize hardware capabilities, a framework is created and within a highly virtualized dynamic networking system to support an efficiency maximization layer, such as a device driver. The efficiency maximization layer manages modes of the hardware, such as a network interface card (NIC), with respect to a capability threshold. In this way, the NIC can be placed into a promiscuous mode when a current virtualization degree (or virtualization demand) of the highly virtualized dynamic networking system exceeds discrete capabilities of the NIC. Further, when the virtualization demand returns to a level within the discrete capabilities of the NIC, the efficiency maximization layer can disable the promiscuous mode Thus, the efficiency maximization layer, at an earliest point at which the promiscuous mode can be disabled, reduces any processing/filtering operations and reclaims an improved performance of the highly virtualized dynamic networking system. Note that while embodiments described herein relate to an efficiency maximization layer of a device driver, embodiments can also include being implemented directly within the NIC, the native firmware of the NIC, and/o externalized via the application programmable interfaces.

The discrete capabilities of the NIC can be based on the number of media access control (MAC) addresses that can be registered to the NIC at any given time. To control the number of MAC addresses registered to the NIC at any given time, the efficiency maximization layer can analyze the MAC states of all MAC addresses configured for that NIC. The MAC state is a mechanism for defining the implementation or nature of each of the configured MAC addresses. For instance, the MAC address state from a perspective of the NIC defines discrete MAC addresses and not-discrete MAC addresses. A discrete MAC address is specifically defined (added or registered) to the NIC. A not-discrete MAC address is not known by the NIC, but enabled for the NIC via setting a promiscuous mode for the NIC.

Promiscuous mode is a configuration to enable the NIC to transmit and receive packets from a plurality of discrete and non-discrete MAC addresses. Promiscuous mode can be enabled for a number of reasons which can co-exist, such as manual and MAC-overflow reasons. The manual reason for promiscuous mode reflects when the highly virtualized dynamic networking system has directly requested the NIC to go into a promiscuous mode. The overflow reason for promiscuous mode reflects when the highly virtualized dynamic networking system has detected that there are MAC addresses configured whose MAC address state is not-discrete (they are not registered to the NIC, hence promiscuous mode is required for them to be received). By saving, controlling, and referencing these promiscuous mode reasons the efficiency maximization layer can be the ultimate arbitrator to set/clear the promiscuous mode to the NIC. This allows promiscuous mode to be cleared at the earliest possible time, yet without clearing it until no further 'reasons' exist for it to be set.

Figure 3:
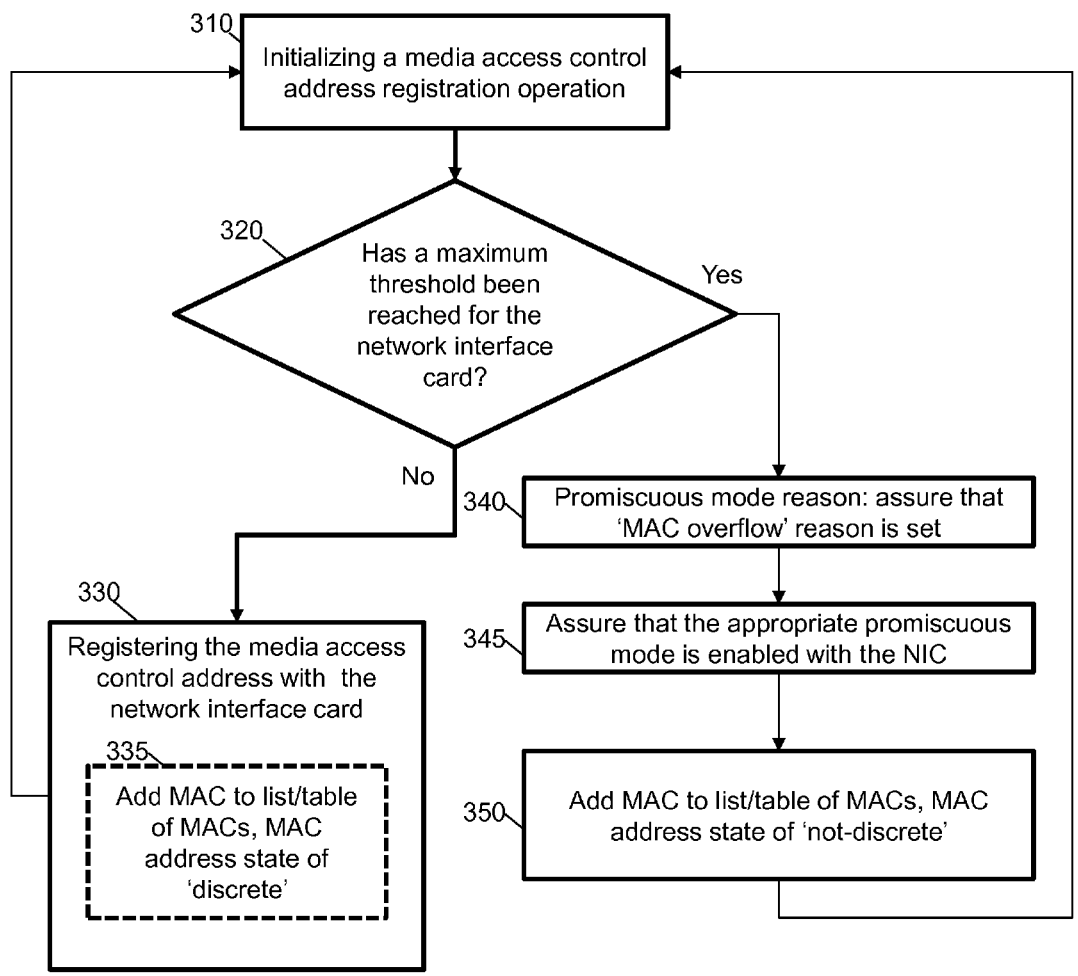
FIG. 3 depicts a process flow for determining a number of media access control addresses with respect to a maximum threshold in accordance with an embodiment.

Turning now to FIG. 3, a process flow 300 for determining a number of MAC addresses with respect to a maximum threshold is depicted in accordance with an embodiment. In general, the process flow 300 maintains the NIC in a normal mode (e.g., prevents the enabling of the promiscuous mode that does not perform as well as the normal mode) until the number of MAC addresses defined to the NIC exceeds what the NIC can support.

The process flow 300 begins at block 310, where the efficiency maximization layer initializes a MAC registration operation of a MAC address. At decision block 320, the efficiency maximization layer performs determines whether the number of MAC addresses configured to the NIC is greater than or equal to a maximum threshold. The number is the sum of entries in the local list of MAC addresses which have a MAC address state of 'discrete' (those actually configured to the card). The maximum threshold is a maximum number of discrete MAC addresses supported by the NIC and can be predetermined by the efficiency maximization layer via input form a user or based on hardware specifications of the NIC. If the number of MAC addresses of the NIC is less than the maximum threshold, then the process flow 300 proceeds to block 330 (indicated by the 'No' arrow). If the number of MAC addresses of the NIC is greater than or equal to the maximum threshold, then the process flow 300 proceeds to block 340 (indicated by the 'Yes' arrow).

At block 330, the efficiency maximization layer performs a MAC registration operation with the NIC by adding the MAC address to a table or list of the efficiency maximization layer. The adding of the NIC can be performed according to the Add MAC Address Heuristic #1. This MAC address is added with a MAC address state designation of 'discrete, as indicated by the dashed-box 335). In this way, the efficiency maximization layer can continue to register MAC addresses, until the number of MAC addresses defined to the NIC is greater than or equal to the maximum threshold (e.g., the maximum number of discrete MACs supported by the associated NIC), which delays an enabling of the promiscuous mode for the associated NIC until the last possible moment required to support all the defined MAC addresses.

---

Add MAC Address Heuristic #1:
  IF (# of MAC addresses defined to NIC < maximum threshold)
    directly add/register MAC address with NIC
    local MAC address state = discrete
  END

---

At block 340, the efficiency maximization layer assures that a promiscuous mode reason includes the value/concept of MAC overflow. If the required promiscuous mode is not yet enabled at the NIC, then it will be enabled (as shown in block 345). Then, at block 350, the efficiency maximization layer adds the MAC address to the table. In block 350, the MAC address is added to the table based on whether with the number of 'discrete' MAC addresses is greater than or equal to the maximum threshold. If the number of 'discrete' MAC addresses is less than the maximum threshold, then the efficiency maximization layer adds the MAC address to the table according to the Add MAC Address Heuristic #1, such that the MAC address state is set to 'discrete.' If the number of 'discrete' MAC addresses is greater than or equal to the maximum threshold, then the efficiency maximization layer adds the MAC address to the table according to the Add MAC Address Heuristic #2, such that the MAC address state is set to not-discrete.

---

Add MAC Address Heuristic #1 (as previously defined):
  IF (# of MAC addresses defined to NIC < maximum threshold)
    Directly register MAC with NIC
    Add MAC to local table of all MACs for this NIC
    set this MAC's MAC address state = discrete
  END

---

Add MAC Address Heuristic #2:
  IF (# of MAC addresses defined to NIC >= maximum threshold)
    Enable the appropriate promiscuous mode at the NIC
    Include 'MAC Overflow' in the Promiscuous mode reasons value
    Add MAC to local table of all MACs for this NIC
    set this MAC's MAC address state = not-discrete
  END

---

In view of the process flow 300, since the efficiency maximization layer adds over time a plurality of MAC addresses with an associated state of not-discrete, the efficiency maximization layer also includes an exit operation from the promiscuous mode at a first possible opportunity, so the highly virtualized dynamic networking system can return to optimal performance. The exit operation is an optimized MAC address de-registration operation that enables the highly virtualized dynamic networking system to take the NIC back out of promiscuous mode at an earliest opportunity, with the least disruption to the NIC configuration and processing.

Figure 4:
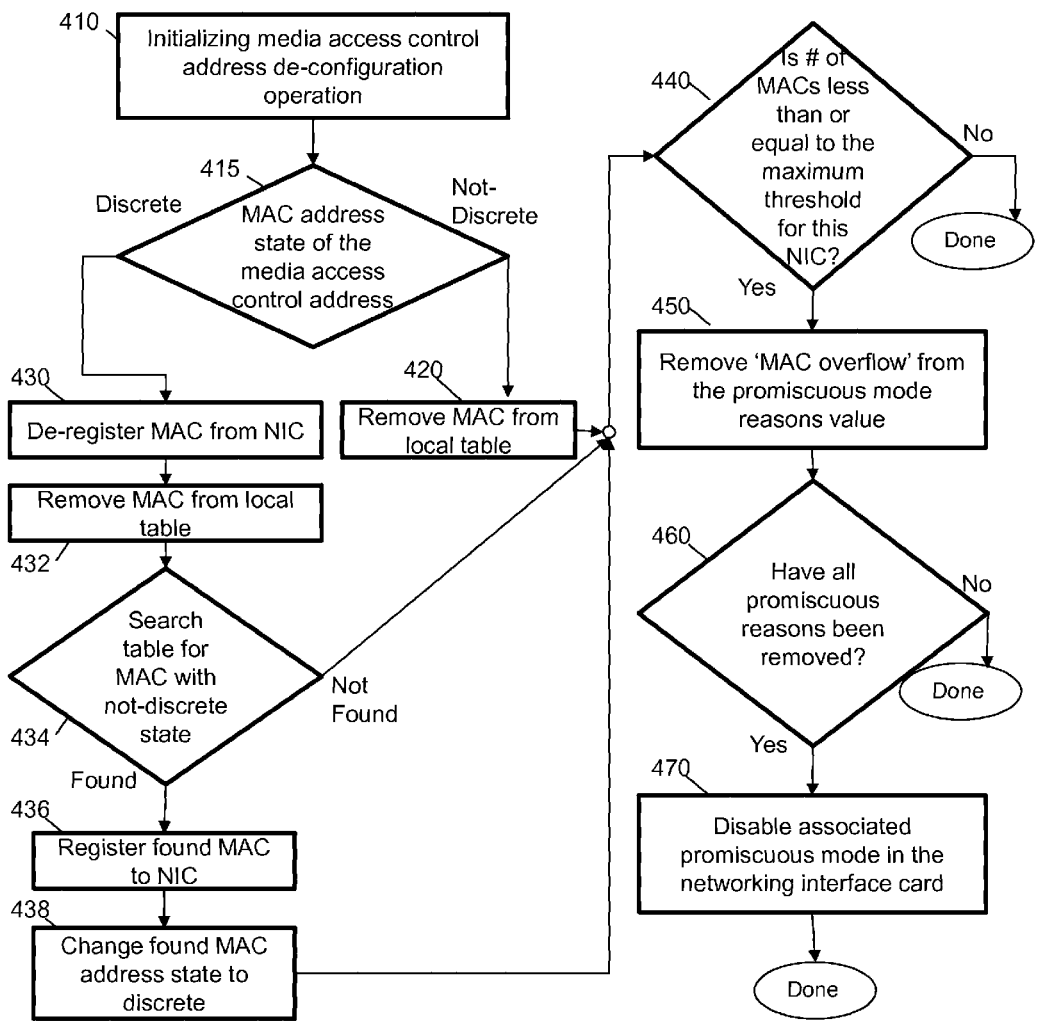
FIG. 4 depicts a process flow for a media access control address de-registration in accordance with an embodiment.

Turning now to FIG. 4, a process flow for performing a media access control de-registration is depicted in accordance with an embodiment. In general, the process flow 400 seeks to eliminate any MAC addresses whose state is 'not discrete', such that if a MAC address with MAC address state of 'discrete' is removed, then that MAC address is removed from the known MAC addresses of the NIC. Further, if a MAC with MAC address state 'not-discrete' is found in the local list/table, then that MAC address is subsequently registered to the NIC and has its state changed to 'discrete.' Once these actions are done, heuristics may be performed to assess the possibility of taking the NIC out of promiscuous mode.

The process flow 400 begins at block 410, where the efficiency maximization layer initializes a MAC de-registration operation of a MAC address. At decision block 415, the efficiency maximization layer acts based upon the state of the MAC address. If the MAC address state of the MAC address is not-discrete, then the process flow 400 proceeds to block 420. At block 420, the efficiency maximization layer removes the MAC address from the table.

If the MAC address state of the MAC address is discrete, then the process flow 400 proceeds to block 430. At block 430, the efficiency maximization layer will attempt to replace the discrete MAC address from the table with a non-discrete MAC address. For instance, the efficiency maximization layer can de-register the MAC address from NIC, remove the MAC address from table (as shown in block 432), and search the table for a 'not-discrete' MAC address (as shown in decision block 434). If a 'not-discrete' MAC address is found, the efficiency maximization layer can register the not-discrete MAC address with the NIC (as shown in block 436) and change its MAC address state to 'discrete' (as shown in decision block 438). Then the process flow 400 proceeds to block 440. If a 'not-discrete' MAC address is not found, then the process flow 400 proceeds to block 440.

At decision block 440, the efficiency maximization determines whether a number of 'discrete' media access control addresses is less than or equal to a maximum threshold for a network interface card. If the number of 'discrete' MAC addresses is greater than the maximum threshold, then the process flow 400 is done (e.g., proceeds to block 410). Eventually as demand decreases to the point where the NIC can/is discretely supporting all MAC addresses (e.g., all MAC address states are 'discrete'). In block 450 the efficiency maximization layer begins heuristics involving the possible optimal disabling of promiscuous mode at the NIC.

If the number of 'discrete' MAC addresses is less than or equal to the maximum threshold, then the process flow 400 proceeds to block 450. At block 450, the efficiency maximization layer removes 'MAC overflow' from the promiscuous mode reasons value. Next, at decision block 460, the efficiency maximization layer determines if all promiscuous reasons have been removed. If all promiscuous reasons have not been removed, then the process flow 400 is done (e.g., proceeds to block 410). If all promiscuous reasons have been removed, then the process flow 400 proceeds to block 470 where the efficiency maximization layer disables associated promiscuous mode in the network interface card, and the process flow is done.

The dynamic process flow 400 thus allows the removal of a NIC promiscuous mode quickly and cleanly at the earliest possible moment, with no mass re-registry of MACs to the NIC (which could slow, or break large workloads). Thus, the process flow 400 assures optimal utilization of the NIC and its MAC address support (a limited resource), assures best performance based on the number of MAC addresses required, assures an earliest return to 'best performance' as/if host demands shift back below the NIC's maximum capability threshold, and with the most dynamic management of MAC addresses with the NIC, avoids the need for possibly disruptive 'complete refreshes' of MAC addresses to the NIC.

Remove MAC Address Heuristic #1 (optimal reduction of not-discrete MACs):

```
IF (MAC's MAC address state == Discrete)
    De-register MAC address from NIC
    Remove MAC from local table
    Search local table for a MAC with state: not-discrete
    IF (found MAC with state of not-discrete)
        Register this MAC to the NIC
        Change MAC's MAC address state to discrete
    END
ELSE (state == not-discrete)
    Remove MAC from local table
END
```

Remove MAC Address Heuristic #2 (promiscuous mode optimization—can/should be performed after completion of 'Remove MAC address Heuristic #1):

```
IF (# of 'discrete' MAC addresses in local table less than or equal to max
    threshold for this NIC)
    Remove 'MAC Overflow' from the Promiscuous mode reasons value
    IF (no Promiscuous mode reasons remain)
        Disable associated promiscuous mode from the NIC
    END
END
```

Technical effects and benefits of embodiments here include optimizing an earliest point at which a promiscuous mode can be disabled to reduce the processing/filtering operations and reclaim improved performance of highly virtualized dynamic networking systems. Thus, embodiments described herein are necessarily rooted in configurable computing resources to perform proactive operations to overcome problems specifically arising in the realm of virtualized networking systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product, the computer program product comprising a computer readable storage medium having program instructions for maximizing hardware capabilities of a network interface card of a virtualized dynamic networking system embodied therewith, the program instructions executable by a processor of the virtualized dynamic networking system to cause the processor to perform:

receiving a media access control address for associating with the network interface card;

comparing a number of media access control addresses defined to the network interface card to a maximum threshold of the network interface card; and in response to when the number is equal to or exceeds the maximum threshold of the network interface card:
  enabling a promiscuous mode for the network interface card, and
  associating the media access control address with the network interface card,
wherein the promiscuous mode is a configuration that enables the network interface card to transmit and receive packets from a plurality of discrete media access control addresses and a plurality of non-discrete media access control addresses,
wherein the enabling of the promiscuous mode is in accordance with a plurality of co-existing reasons being active and a clearance of the promiscuous mode is in accordance with a time when none of the plurality of co-existing reasons are active,
wherein the plurality of co-existing reasons comprising a manual reason and an overflow reason,
wherein the plurality of discrete media access control addresses comprises addresses specifically registered to the network interface card,
wherein the plurality of non-discrete media access control addresses comprises addresses not known by the network interface card and enabled for the network interface card via the enabling of the promiscuous mode for the network interface card.

2. The computer program product of claim 1, wherein the number of media access control addresses is based on the plurality of discrete media access control addresses presently defined to the network interface card and the media access control address.

3. The computer program product of claim 1, wherein a state of the media access control address is set to discrete when the number is equal to the maximum threshold of the network interface card.

4. The computer program product of claim 1, wherein the media access control address is added to a table with a state set to discrete in response to when the number is less than the maximum threshold of the network interface card.

5. The computer program product of claim 1, wherein the program instructions are further executable by the processor of the virtualized dynamic networking system to cause the processor to perform:
  performing a de-registration of a second media access control address by:
    removing the second media access control address from a table,
    changing a state of the media access control address from not-discrete to discrete.

6. The computer program product of claim 1, wherein the manual reason comprises when the virtualized dynamic networking system has directly requested the network interface card to go into the promiscuous mode.

7. The computer program product of claim 1, wherein the overflow reason comprises when the virtualized dynamic networking system has detected that there are one or more media access control addresses configured as non-discrete media access control addresses.

8. A virtualized dynamic networking system comprising:
  a memory having computer readable instructions for maximizing hardware capabilities of a network interface card of the virtualized dynamic networking system; and
  a processor for executing the computer readable instructions, the computer readable instructions including:
    receiving a media access control address for associating with the network interface card;
    comparing a number of media access control addresses defined to the network interface card to a maximum threshold of the network interface card; and
    in response to when the number is equal to or exceeds the maximum threshold of the network interface card:
      enabling a promiscuous mode for the network interface card, and
      associating the media access control address with the network interface card,
    wherein the promiscuous mode is a configuration that enables the network interface card to transmit and receive packets from a plurality of discrete media access control addresses and a plurality of non-discrete media access control addresses,
    wherein the enabling of the promiscuous mode is in accordance with a plurality of co-existing reasons being active and a clearance of the promiscuous mode is in accordance with a time when none of the plurality of co-existing reasons are active,
    wherein the plurality of co-existing reasons comprising a manual reason and an overflow reason,
    wherein the plurality of discrete media access control addresses comprises addresses specifically registered to the network interface card,
    wherein the plurality of non-discrete media access control addresses comprises addresses not known by the network interface card and enabled for the network interface card via the enabling of the promiscuous mode for the network interface card.

9. The system of claim 8, wherein the number of media access control addresses is based on the plurality of discrete media access control addresses presently defined to the network interface card and the media access control address.

10. The system of claim 8, wherein a state of the media access control address is set to discrete when the number is equal to the maximum threshold of the network interface card.

11. The system of claim 8, wherein the media access control address is added to a table with a state set to discrete in response to when the number is less than the maximum threshold of the network interface card.

12. The system of claim 8, wherein the computer readable instructions including:
  performing a de-registration of a second media access control address by:
    removing the second media access control address from a table,
    changing a state of the media access control address from not-discrete to discrete.

\* \* \* \* \*